United States Patent [19]
Rudolph

[11] Patent Number: 5,316,274
[45] Date of Patent: May 31, 1994

[54] RUBBER BEARING THAT SUPPRESSES VIBRATIONS HYDRAULICALLY

[75] Inventor: Axel Rudolph, Bensheim, Fed. Rep. of Germany

[73] Assignee: Firma Carl Freudenberg, Weinheim/Bergstrasse, Fed. Rep. of Germany

[21] Appl. No.: 902,099

[22] Filed: Jun. 22, 1992

[30] Foreign Application Priority Data

Aug. 13, 1991 [DE] Fed. Rep. of Germany ....... 4126674

[51] Int. Cl.5 .............................................. F16M 5/00
[52] U.S. Cl. ................................. 267/140.12; 267/219
[58] Field of Search ...................... 267/140.11, 140.12, 267/141.2, 219, 220, 35, 64.19, 64.23; 180/300, 312, 902; 248/562, 636

[56] References Cited

FOREIGN PATENT DOCUMENTS 0271848 6/1988 European Pat. Off. ............ 267/219
1116330 5/1989 Japan .............................. 267/140.12

Primary Examiner—Robert J. Oberleitner
Assistant Examiner—Lee W. Young
Attorney, Agent, or Firm—Sprung Horn Kramer & Woods

[57] ABSTRACT

A rubber bearing that suppresses vibrations hydraulically includes two liquid-filled compartments that communicate through an antivibration aperture and are separated from two gas compartments by a resilient diaphragm. The gas compartments also communicate with each other through a connecting aperture. The bearing serves to isolate acoustically irritating vibrations of smaller amplitude.

5 Claims, 2 Drawing Sheets

RUBBER BEARING THAT SUPPRESSES VIBRATIONS HYDRAULICALLY

BACKGROUND OF THE INVENTION

The invention concerns a rubber bearing that suppresses vibrations hydraulically with two liquid-filled compartments that communicate through an antivibration aperture and are separated from gas compartments by a resilient, compensating diaphragm.

A bearing of this type is disclosed in the German Patent Publication No. OS 3,145,446. The gas compartments are intended to carry out specific vibration-suppression tasks such as varying the original spring force or adjusting the level of the motor vehicle that accommodates the bearing.

SUMMARY OF THE INVENTION

The principal object of the present invention is to provide a rubber bearing of the aforesaid type that will better isolate acoustically irritating vibrations of smaller amplitude.

This object, as well as other objects that will be apparent from the following discussion, is attained, in accordance with the present invention, in that the gas compartments also communicate through a connecting aperture. When the bearing is inactive—that is, when no vibrations are present—the pressure in each gas compartment will be equal, and each will accordingly be equally resilient. This resilience will not be perceptibly affected by acoustically irritating vibrations with higher frequencies. The gas compartments will accordingly be particularly effective in compensating for any changes in pressure that occur when such vibrations are introduced into the liquid compartments. These vibrations will not be transmitted to the base of the bearing.

Changes will occur, however, in the capacity of the liquid compartments in such a bearing when shorter-amplitude vibrations are introduced. The gas compartment associated with the more pressurized liquid compartment will become smaller, and the gas will flow without significant resistance into the gas compartment associated with the less pressurized liquid compartment. The walls of the liquid compartments will accordingly not distend and the liquid will not flow through the aperture between them. Dynamic resilience will not increase.

The system is designed such that almost all the gas will be forced out of the gas compartment associated with the more pressurized liquid compartment in the event of wide activating amplitudes, allowing liquid to flow through the aperture. The result will be excellent vibration suppression. Vibrations of this type can occur, for example, when a vehicle employing the rubber bearing travels over a rough road. High-frequency vibrations, on the other hand, in this case are those deriving from the operation of the internal-combustion engine itself.

It is also of major significance for the diaphragm to have a structure that faces the main section of the bearing to avoid impact noise. The communicating gas compartments also have an air vent, which can, for example, be constituted by a bore in the outer fitting. There is a particular advantage to the air vent when the diaphragm is made of a resilient material. A very narrow aerating bore that allows only more or less static communication with the atmosphere is of advantage although it will hardly affect the dynamic interaction between the gas compartments. The diaphragm could also be made of aluminum foil, for example. Since such a material is absolutely fluid-proof, there would be no need for an air vent. The connecting aperture can be an antivibration aperture, allowing higher-frequency reduction of dynamic resilience to some extent.

One advantageous embodiment of the invention has a relatively mobile component at a distance upstream of at least one diaphragm in the direction the component moves in. The advantage is that the diaphragms are extensively protected from mechanical stress, extending the bearing's life and making it more reliable.

The gas compartments are preferably enclosed in moldings that merge integrally into each other. Such an embodiment is particularly simple to manufacture and install. It turns out to be practical for the molding to have at least one finger-shaped section that projects into the associated liquid compartment with its base secured to a round area of the bearing. Such a molding can be economically manufactured by a known immersion procedure.

The preferred embodiments of the present invention will now be described with reference to the accompanying drawings.

DESCRIPTION OF THE PREFERRED EMBODIMENTS

Figure 1:
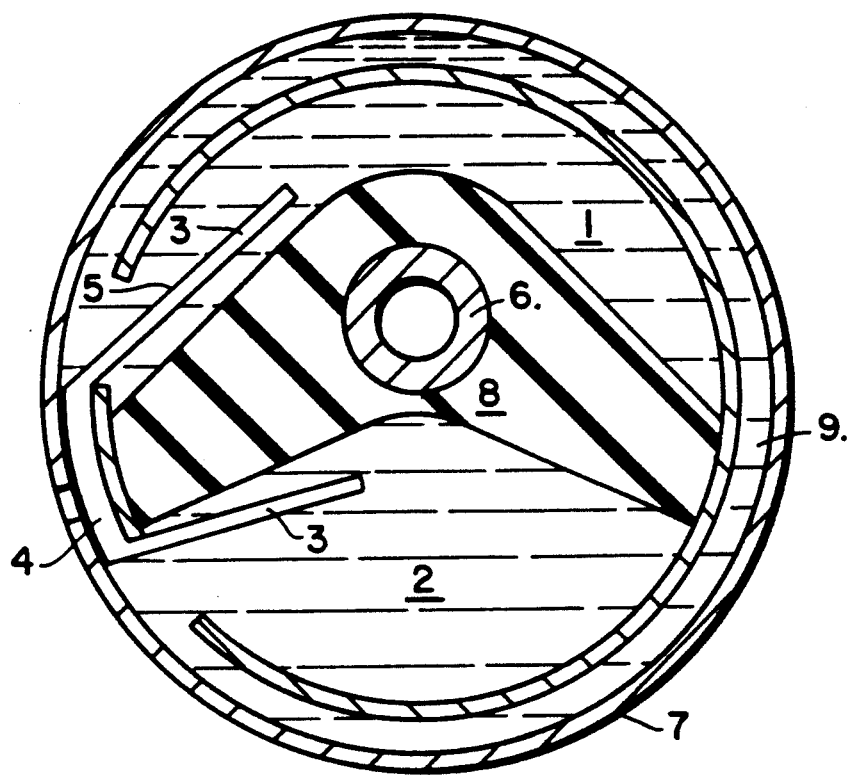
FIG. 1 is cross-sectional view through one preferred embodiment of the rubber bearing in accordance with the invention.
Figure 2:
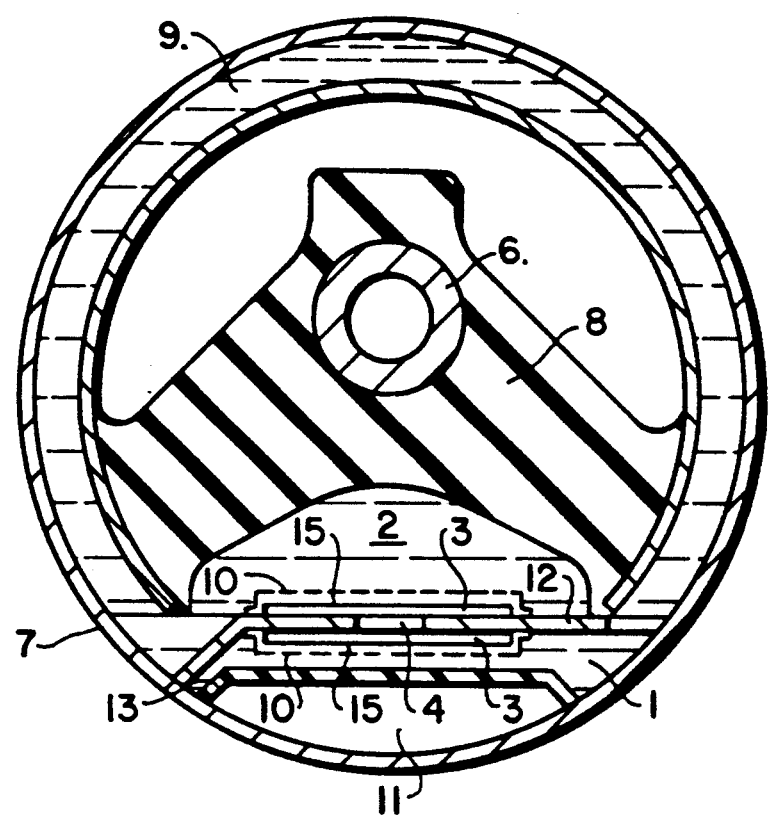
FIG. 2 is a cross-sectional view through another preferred embodiment of the rubber bearing in accordance with the invention.

The rubber bearings illustrated in FIGS. 1 and 2 are in the form of a bushing. It is nevertheless possible to apply the theory of the present invention to other bearing designs, such as those disclosed in the German Patent Publication No. OS 2,727,244.

Common to all conceivable versions are two fittings 6 and 7 for the attachment of respective, adjacent, mechanical components. The fittings 6 and 7 are made of a hard material, metal for example, and resiliently connected together by a flexible cushion 8.

The fittings 6 and 7 in the embodiments illustrated in FIGS. 1 and 2 are cylindrical and are concentrically arranged. As noted above, they are resiliently connected by a rubber cushion 8. The cushion 8 accommodates two liquid-filled compartments 1 and 2 that communicate through an antivibration aperture 9. In the event of low-frequency and wide-amplitude vibrations, as can occur when the rubber bearing is employed in a motor vehicle traveling over a rough road for example, the fittings 6 and 7 will move toward and away from each other due to the resilience of the bearing. The capacity of liquid-filled compartments 1 and 2 will alternately increase and decrease, forcing liquid back and forth, into whichever compartment is less pressurized, through the antivibration aperture 9. The resulting effect of the antivibration aperture 9 is to suppress the vibrations.

The embodiment illustrated in FIG. 1 has a finger-shaped section of a readily deforming compensating diaphragm 5 in each liquid-filled compartment 1 and 2. The diaphragms are formed of moldings that merge integrally into each other and are occupied in their interior space 3 by gas. The base of each molding rests on a stationary component of the bearing, for example the outer fitting 7, enclosing a gas space 4. The finger-like sections that project into each liquid-filled compartment 1 and 2 enclose the contour of the cushion 8 at a distance in the direction the component moves in. In the event of high-frequency vibrations, the variations in pressure in liquid-filled compartments 1 and 2 generate an alternating decrease in the volume of the sections of diaphragm 5, excellently isolating these vibrations.

Both of the diaphragms facing the cushion 8 in this example are adjacent to and separated from it. It is of advantage for the separation to be wide enough to prevent the cushion 8 from coming into contact with the diaphragms 5 during normal operation. Mechanical stress on the diaphragms 5 is accordingly reduced as much as possible, ensuring reliability and long life.

The embodiment illustrated in FIG. 2 is also a bushing and is outwardly similar to the bearing described above. The capacities of the liquid-filled compartments 1 and 2, however, are much smaller. The second compartment, liquid-filled compartment 1, is also separated by a flexible and diaphragm-like partition 13 from a buffer compartment 11 that communicates with the atmosphere through a wide aperture. Compartment 1 is accordingly capable of accommodating additional liquid with little or no increase in pressure. Accordingly, no matter how much load the bearing is being subjected to, almost no pressure can become established in the two liquid-filled compartments that communicate through antivibration aperture 9, while the bearing is in a static state of rest.

Compartments 1 and 2 are full of hydraulic liquid and separated by a metal partition 12. A connecting aperture 4 extends through the center of the partition 12. The partition demarcates two gas compartments 3 separated from the liquid-filled compartments 1 and 2 by two thin membranes 15. The membranes 15 move back and forth between constraints on each side. One constraint is constituted by a partition 12 and the other by a rigid perforated screen 10 secured to the partition 12. The screen prevents damage to membranes 15 due to overload.

The operation of the bearing will now be described.

Acoustically irritating high-frequency vibrations will only apply forces to membranes 5 and 15 alternately, preventing the pressurization of the liquid-filled compartments 1 and 2. Such vibrations are accordingly isolated.

Wider-amplitude vibrations, on the other hand, will force fluid back and forth between the liquid-filled compartments 1 and 2 through the antivibration aperture 9 and will accordingly be extensively suppressed.

There has thus been shown and described a novel rubber bearing that suppresses vibrations hydraulically which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a rubber bearing that suppresses vibrations hydraulically having two liquid-filled compartments separated by a resilient element that communicate through a first connecting aperture and having two gas-filled compartments, each disposed in a respective one of said liquid-filled compartments and communicating with each other through a second connecting aperture, the improvement wherein each gas-filled compartment is elongate in shape and is enclosed on opposite sides by separate, resilient compensating walls such that the compensating walls are substantially surrounded by liquid of the respective liquid-filled compartments.

2. The rubber bearing defined in claim 1, wherein the compensating walls of each gas-filled compartment comprise a relatively mobile component spaced from the resilient element in the direction of vibrations applied to the bearing.

3. The rubber bearing defined in claim 1, wherein the compensation walls of the gas-filled compartments comprises moldings that merge integrally into each other.

4. The rubber bearing defined in claim 1, wherein the compensating walls of each gas-filled compartment define a finger-shaped section that projects into one of said liquid-filled compartments, said gas-filled compartment having a base secured to a stationary part of the bearing.

5. The rubber bearing defined in claim 1, wherein the compensating walls on opposite sides of at least one of said gas-filled compartments extend substantially in parallel.

* * * * *